United States Patent [19]
Lee

[11] Patent Number: 5,803,589
[45] Date of Patent: Sep. 8, 1998

[54] CEILING LIGHTING FIXTURE

[76] Inventor: Chi-Hsiang Lee, No. 22, Lane 67, Ta Chih Street, Taipei, Taiwan

[21] Appl. No.: 783,293

[22] Filed: Jan. 10, 1997

[51] Int. Cl.⁶ .................................................. F21S 3/00
[52] U.S. Cl. .................... 362/225; 362/276; 362/370; 362/260; 362/221; 362/394
[58] Field of Search ................... 362/225, 276, 362/370, 389, 260, 221, 394

[56] References Cited

U.S. PATENT DOCUMENTS

| | | | |
|---|---|---|---|
| 5,282,118 | 1/1994 | Lee | 362/276 |
| 5,381,323 | 1/1995 | Osteen et al. | 362/276 |
| 5,434,764 | 7/1995 | Lee et al. | 362/276 |
| 5,442,532 | 8/1995 | Boulos et al. | 362/276 |
| 5,473,522 | 12/1995 | Kriz et al. | 362/221 |
| 5,513,085 | 4/1996 | Bourne | 362/286 |
| 5,575,557 | 11/1996 | Huang et al. | 362/276 |
| 5,588,738 | 12/1996 | Meoli | 362/184 |
| 5,590,953 | 1/1997 | Haslam et al. | 362/276 |
| 5,607,217 | 3/1997 | Hobbs, II | 362/35 |

*Primary Examiner*—Ira S. Lazarus
*Assistant Examiner*—Nhat-Hang H. Lam
*Attorney, Agent, or Firm*—Donald C. Casey, Esq.

[57] ABSTRACT

A ceiling lighting fixture, including a rectangular bottom-open casing having a plurality of parallel partition frames and an electric connector connected to external power supply, a plurality of lamp tubes respectively mounted in the casing and separated by the partition frames and electrically connected to the electric connector, and a cylindrical sensor-controlled switch adapted for detecting the presence of persons and switching on/off the electric connector subject to its detection result, one of the partition frames having a rounded switch mounting hole and a plurality of bendable locating strips respectively projecting into the switch mounting hole at different angles, the cylindrical sensor-controlled switch being mounted in the rounded switch mounting hole and connected to the electric connector, having a plurality of recessed holes spaced around the periphery and forced into engagement with the locating strips.

1 Claim, 4 Drawing Sheets

CEILING LIGHTING FIXTURE

BACKGROUND OF THE INVENTION

The present invention relates to lighting fixtures for offices, and relates more particularly to the power control circuit arrangement of a ceiling lighting fixture.

Embedded type ceiling lighting fixtures are intensively used in offices for illumination. When several ceiling lighting fixtures are installed in the ceiling, an ON/OFF switch is commonly used to control the operation of these ceiling lighting fixtures. As an ON/OFF switch is a manual switch, it must be operated manually. When office staffs leave the office without switching off the switch, the ceiling lighting fixtures keep consuming power supply.

SUMMARY OF THE INVENTION

The present invention provides a ceiling lighting fixture with a sensor-controlled switch. The sensor-controlled switch detects the presence of a person within a detective range in all angles, and turns on the ceiling lighting fixture immediately when the sensor is induced. When the sensor detects no signal, the switch immediately cuts off power supply. The ceiling lighting fixture has a rounded switch mounting hole, which receives the sensor-controlled switch. The sensor-controlled switch has a cylindrical shape fitting the rounded switch mounting hole, and a plurality of recessed portions spaced around the periphery and forced into engagement with respective locating strips in the rounded switch mounting hole.

DETAILED DESCRIPTION OF THE PREFERRED EMBODIMENT

Figure 1:
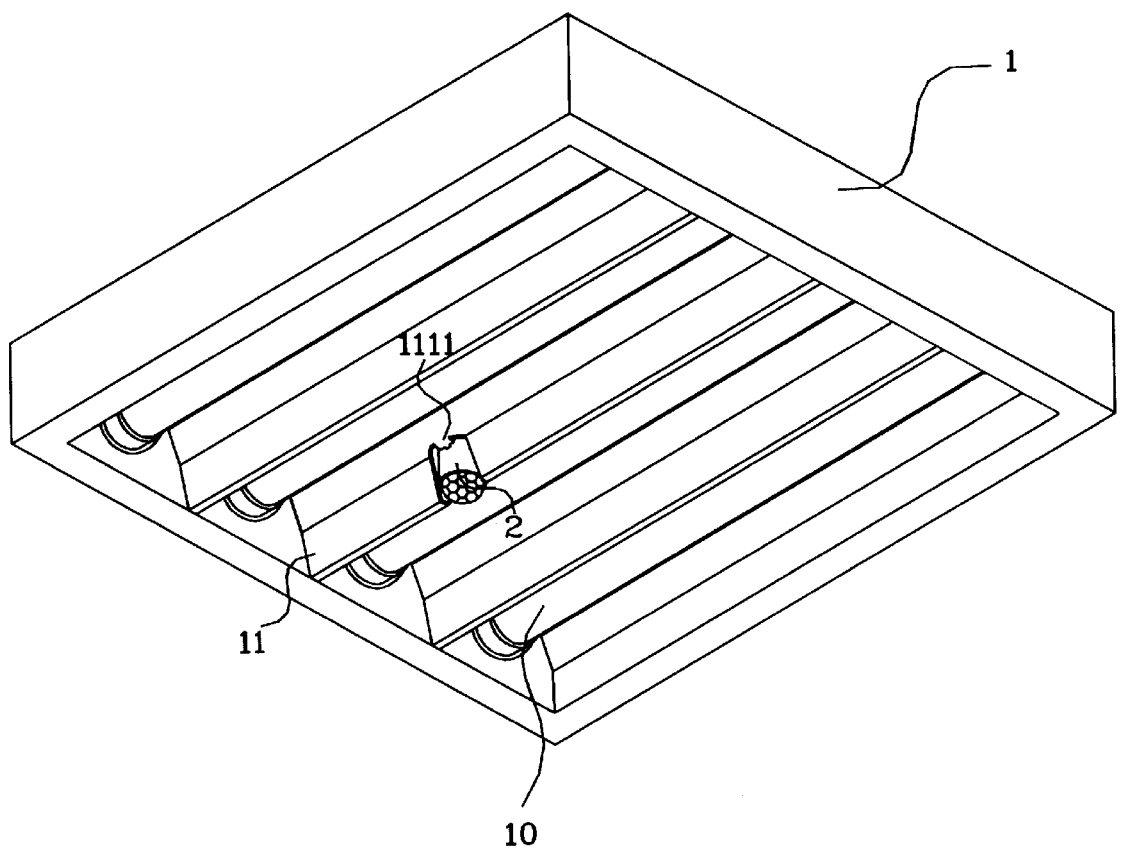
FIG. 1 is an elevational view of a ceiling lighting fixture according to the present invention.
Figure 2:
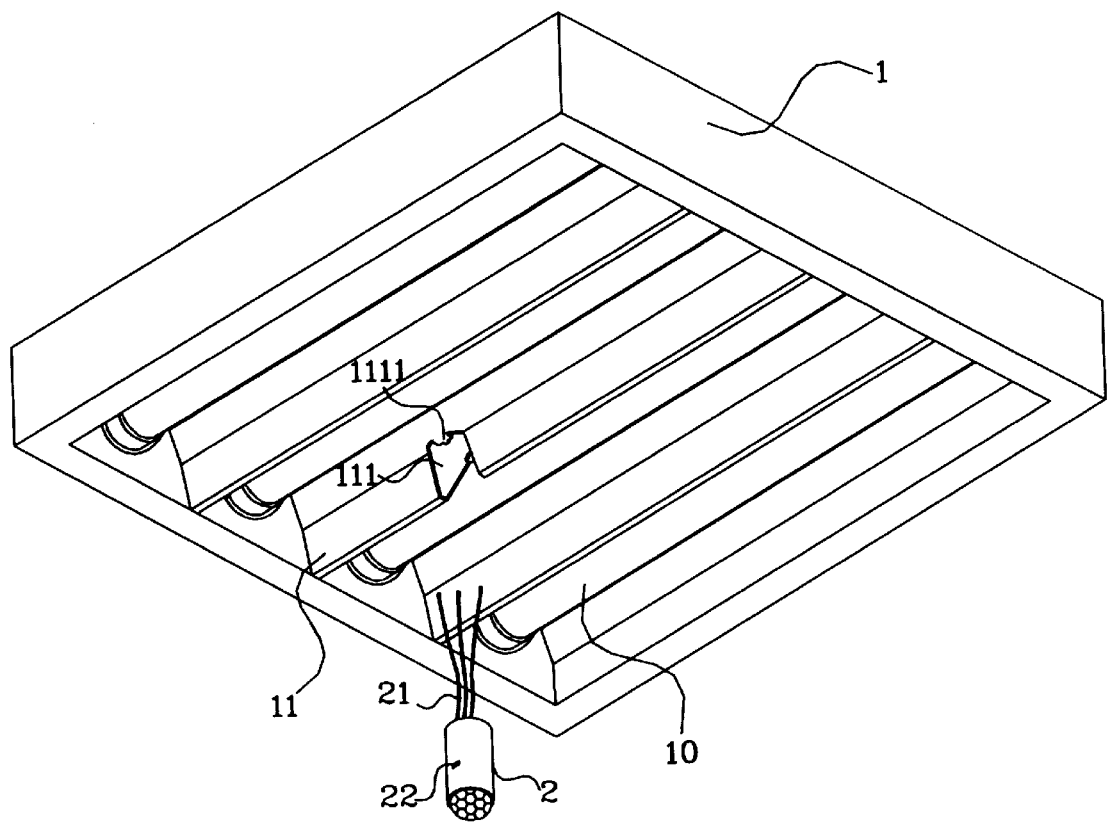
FIG. 2 is similar to FIG. 1 but showing the cylindrical sensor-controlled switch dismounted.
Figure 3:
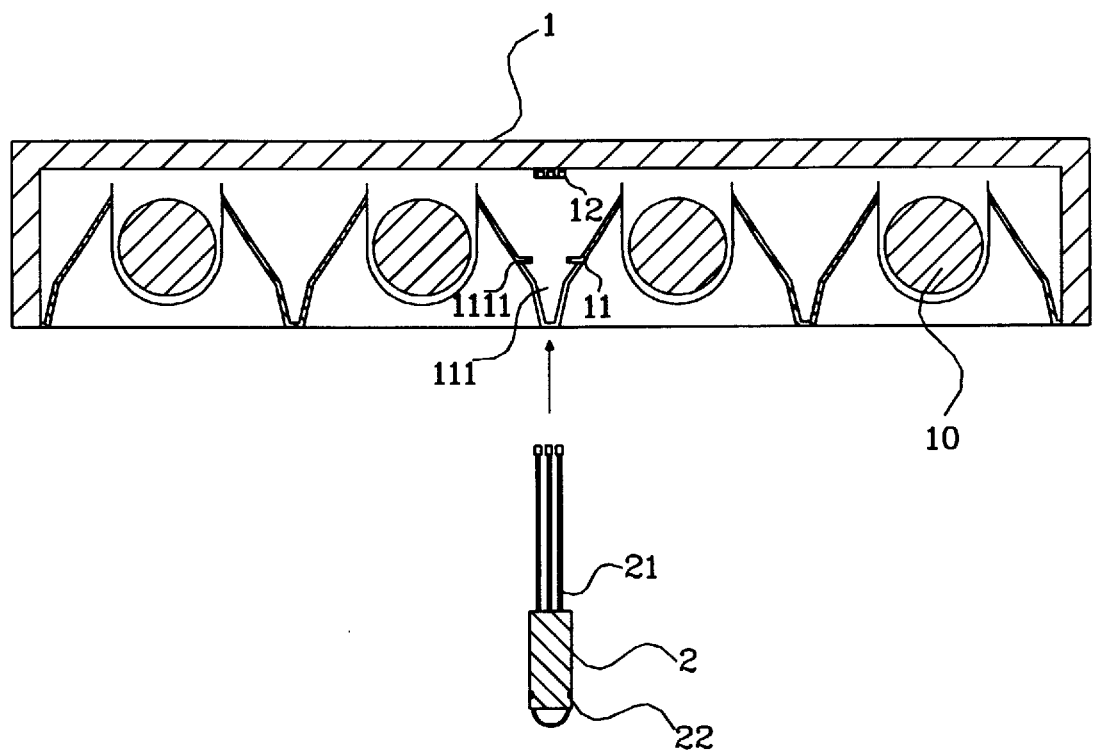
FIG. 3 is a sectional view of FIG. 2.
Figure 4:
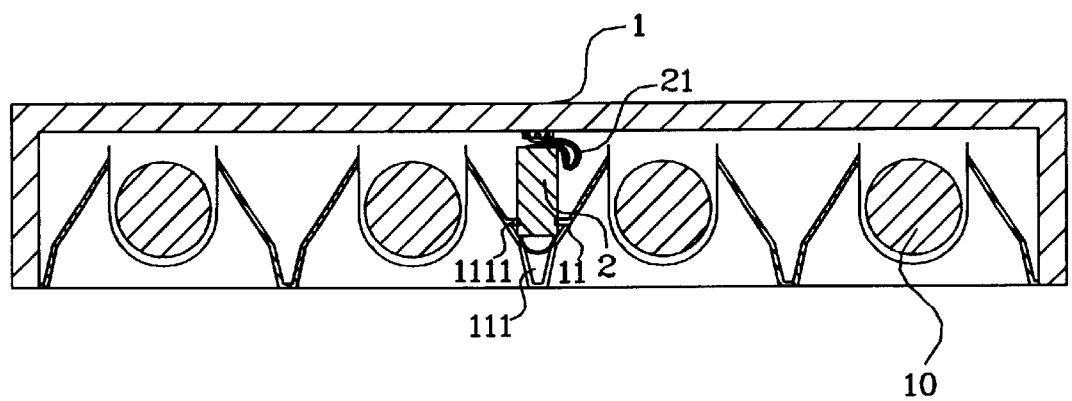
FIG. 4 is a sectional view of FIG. 1.

Referring to FIGS. from 1 to 4, a ceiling lighting fixture in accordance with the present invention is generally comprised of a rectangular bottom-open casing 1 having a plurality of parallel partition frames 11, and a plurality of lamp tubes 10 respectively mounted in the casing 1 and separated by the partition frames 11. An electric connector 12 is mounted inside the casing 1 and connected to power supply. The electric circuits of the lamp tubes 10 are respectively connected to the electric connector 12. One of the partition frames 11 comprises a rounded switch mounting hole 111, and a plurality of bendable locating strips 1111 respectively projecting into the switch mounting hole 111 at different angles. A cylindrical sensor-controlled switch 2 is mounted in the rounded switch mounting hole 111, having electric lead wires 21 connected to the electric connector 12, and a plurality of recessed holes 22 spaced around the periphery and forced into engagement with the locating strips 1111. The sensor-controlled switch 2 is comprised of an infrared sensor and an electronic control circuit. Upon the presence of a person within the detective range of the infrared sensor, the infrared sensor is induced to turn on the electric connector 12, thereby causing the lamp tubes 10 to be turned on. When the infrared sensor detects no signal, it immediately switches off the electric connector 12, causing the lamp tubes 10 to be turned off. As the sensor-controlled switch 2 is of the known art, its structure is not described in detail.

It is to be understood that the drawings are designed for purposes of illustration only, and are not intended as a definition of the limits and scope of the invention disclosed.

What the invention claimed is:

1. A ceiling lighting fixture, comprising a rectangular bottom-open casing having a plurality of parallel partition frames and an electric connector connected to external power supply, a plurality of lamp tubes respectively mounted in said casing and separated by said partition frames and electrically connected to said electric connector, and a cylindrical sensor-controlled switch adapted for detecting the presence of persons and switching on/off said electric connector subject to its detection result, wherein one of said partition frames comprises a rounded switch mounting hole, and a plurality of bendable locating strips respectively projecting into said switch mounting hole at different angles; said cylindrical sensor-controlled switch is mounted in said rounded switch mounting hole and connected to said electric connector, having a plurality of recessed holes spaced around the periphery and forced into engagement with said locating strips.

* * * * *